United States Patent
Hameury

(10) Patent No.: US 6,806,699 B2
(45) Date of Patent: Oct. 19, 2004

(54) METHOD AND APPARATUS FOR MONITORING LIVE ELECTRICAL EQUIPMENT AT HIGH OR MEDIUM VOLTAGE

(75) Inventor: Hervé Hameury, Macon (FR)

(73) Assignee: Alstom, Paris (FR)

( * ) Notice: Subject to any disclaimer, the term of this patent is extended or adjusted under 35 U.S.C. 154(b) by 202 days.

(21) Appl. No.: 09/901,623

(22) Filed: Jul. 11, 2001

(65) Prior Publication Data

US 2002/0008504 A1 Jan. 24, 2002

(30) Foreign Application Priority Data

Jul. 12, 2000 (FR) .............................................. 00 09146

(51) Int. Cl.$^7$ .............................................. G01R 25/02
(52) U.S. Cl. ...................................... 324/95; 324/158.1
(58) Field of Search ................................. 324/126, 127, 324/142, 95, 96; 340/870.17; 374/120, 152, 163; 702/62

(56) References Cited

U.S. PATENT DOCUMENTS

| | | | | |
|---|---|---|---|---|
| 4,384,289 A | * | 5/1983 | Stillwell et al. | 340/870.17 |
| 4,709,339 A | * | 11/1987 | Fernandes | 700/293 |
| 5,257,863 A | | 11/1993 | Chu et al. | 374/153 |

FOREIGN PATENT DOCUMENTS

| | | | | |
|---|---|---|---|---|
| DE | 1 178 937 | 10/1964 | | |
| DE | 25 32 081 | 2/1977 | ............ | G01K/5/72 |
| DE | 298 14 738 | 4/1999 | ........... | G08B/19/00 |

OTHER PUBLICATIONS

European Search Report dated Feb. 23, 2001.
Patent Abstract of Japan vol. 1997, No. 06, Jun. 30, 1997 and JP 09 034916 Feb. 7, 1997.

* cited by examiner

*Primary Examiner*—Vinh P. Nguyen
(74) *Attorney, Agent, or Firm*—Sughrue Mion, PLLC

(57) ABSTRACT

An apparatus for monitoring live electrical equipment at high or medium voltage includes a sensor unit placed on the equipment having a first radio antenna, a sensor for producing a digital signal related to a determined physical parameter at a point to be monitored, and an amplitude-modulator connected to the sensor and to the first antenna, and activated by the energy received by said antenna; a transceiver unit placed outside the equipment and having a second radio antenna for illuminating the first antenna, a power supply source, and a signal processor connected to the second antenna; and the first antenna retransmitting towards the second antenna the radio wave that has been transmitted thereby, while simultaneously amplitude-modulating it in response to the output signal of the sensor, and the processor being arranged to provide a signal related to said parameter.

17 Claims, 1 Drawing Sheet

METHOD AND APPARATUS FOR MONITORING LIVE ELECTRICAL EQUIPMENT AT HIGH OR MEDIUM VOLTAGE

The present invention relates to monitoring live electrical equipment at high or medium voltage.

More specifically, the invention relates to monitoring high or medium voltage electrical equipment such as a distribution bay in which the live elements such as the conductors, e.g. busbars or cables, or indeed the insulating parts, are inaccessible, and more particularly the invention relates to monitoring the temperature of such elements.

BACKGROUND OF THE INVENTION

Conventional practice in monitoring the temperature of live conductors in high or medium voltage equipment consists in taking periodic measurements by means of an infrared camera, and for locations that are inaccessible that requires portholes which are transparent in the infrared. That solution is expensive. Furthermore, it does not provide continuous monitoring. However, it is desirable to be able to monitor the temperature of a set of busbars or other live conductors on a continuous basis so as to be able to detect local overheating and take the necessary preventive measures immediately. Otherwise there is a risk of a thermal runaway phenomenon occurring, and that can have very severe consequences for the equipment.

The use of infrared thermal sensors for continuous monitoring has been studied, but it comes up against difficulties associated with implementation and with the high cost of such components. In addition, those sensors are sensitive to the high electric fields that are produced by the currents being carried by the conductors.

Proposals have been made (Mat Post 99, M 2.3 "Diagnostic thermique des tableaux MT: une solution économique et sûre, basée sur un capteur optique" [Temperature diagnosis of medium voltage control boards: a solution which is low in cost and reliable, based on an optical sensor] by C. Petit), to use an optical sensor that emits a signal by fluorescence and whose behavior depends on temperature. Nevertheless, that system requires an optical fiber link between the sensor and equipment that includes a light-emitting diode and a photodetector, thereby giving rise to implementation difficulties. In addition, optical fibers are sensitive to mechanical phenomena.

OBJECTS AND SUMMARY OF THE INVENTION

The invention seeks to make it possible to monitor live conductors in high or medium voltage electrical equipment, in a manner that is simple, reliable, and economical.

In accordance with a first aspect of the invention, there is provided a method of monitoring live electrical equipment at high or medium voltage, the method comprising the following steps:

- illuminating a zone of the equipment in radio energy close to a point where a physical parameter is to be monitored;
- re-emitting the received wave with amplitude-modulation responsive to a digital signal related to said physical parameter; and
- receiving the retransmitted wave outside the equipment and demodulating it to obtain a signal related to said parameter.

In appropriate manner, said physical parameter is temperature.

In an appropriate embodiment, said signal is indicative of a threshold being crossed by said parameter.

According to another aspect of the invention, there is provided an apparatus for monitoring high or medium voltage live electrical equipment, the apparatus comprising:

- at least one sensor unit placed on the equipment, comprising a first radio antenna, a sensor for producing a digital signal related to a determined physical parameter at a point to be monitored, and amplitude-modulation means connected to the sensor and to the first antenna, and activated by the energy received by said antenna;
- a transceiver unit placed outside the equipment and having a second radio antenna for illuminating the first antenna, a power supply source, and signal processing means connected to the second antenna; and
- the first antenna retransmitting towards the second antenna the radio wave that has been transmitted thereby, while simultaneously amplitude-modulating it in response to the state of the sensor, said processing means being arranged to provide a signal related to said parameter.

BRIEF DESCRIPTION OF THE DRAWING

The invention will be well understood on reading the following description of an embodiment, given with reference to the accompanying drawing, in which.

MORE DETAILED DESCRIPTION

Figure 1:
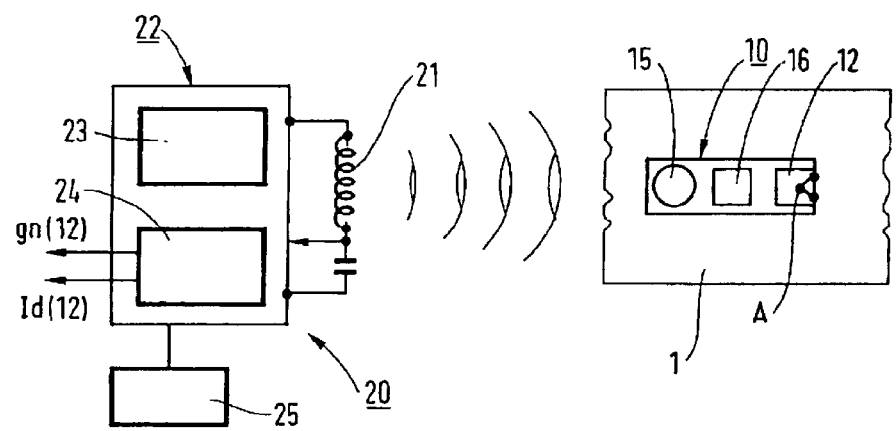
FIG. 1 is a diagrammatic view of apparatus of the invention.

A medium voltage distribution bay comprises a set of conductive busbars for each phase, with one such busbar being referenced 1 in the drawing. It is desirable to monitor continuously the temperature $T_A$ at a point A on the busbar 1, e.g. at a connection. To this end, a sensor unit given overall reference 10 is secured to the busbar 1.

The sensor unit comprises firstly a temperature sensor 12 placed so as to be responsive to the temperature at the point A. In the described embodiment, the sensor 12 is responsive to the temperature $T_A$ crossing a determined threshold $S_A$. In general terms, the threshold $S_A$ is determined as a function of the element being monitored so that when this threshold is crossed that corresponds to local heating that, a priori, is abnormal. By way of example, this threshold can lie in a temperature range extending from 50° C. to 150° C. The sensor 12 is a component having two states (an "on/off" sensor) which changes state on crossing the threshold $S_A$.

It is appropriate for a sensor of this type to be constituted by a component of the kind known as a temperature switch, where such a component associates a temperature sensitive element such as an element that makes use of thermal expansion and that is located at point A with a contact that is normally open and that switches to the closed state when the temperature $T_A$ becomes greater than the threshold $S_A$, thereby causing the expansion to which said element is subject to exceed a certain value. Such a sensor does not require a power supply in order to operate.

The sensor unit can also comprise an element constituting a radio antenna 15 and a circuit 16 associated with the antenna 15 and connected to the temperature sensor 12. The antenna 15 can be suitably constituted by a loop of very small dimensions, occupying an area of about 1 square centimeter. The circuit 16 has means for modulating the amplitude of the radio signal applied to the antenna 15 as a function of the state of the sensor 12, and more precisely as a function of whether or not the contact of the sensor 12 is open or closed. In appropriate manner, the circuit 16 also has means for modulating the amplitude of the radio signal as a function of an address or identity data specific to the sensor unit, and made up of an N-bit word (where N lies in the range 96 to 128). These two kinds of modulation can be combined simply as follows: modulation by means of the sensor address remains unchanged if the contact of the sensor 12 remains in the open state, and it is modified if the contact switches to the closed state. The circuit 16 also comprises, in appropriate manner, means for supplying the electrical power required to enable it to operate on the basis of radio power received by the antenna 15. Thus, the sensor unit 10 is a passive unit and does not require its own power source.

A transceiver unit 20 is also provided comprising an element that forms a radio antenna 21 that is located in the bay. The antenna 21 is close enough to the antenna 15 of the sensor unit to receive radio energy therefrom at a suitable level. Since the antenna 15 is a low power antenna given its surface area, an appropriate distance is of meter order.

A suitable radio transmission frequency is of the order of 100 kHz. At this frequency, the electric fields due to the very high currents being carried by the sets of busbars do not give rise to significant levels of disturbance to radio transmission.

The antenna 21 is associated with an electronic circuit 22 that includes a transmitter unit 23 that performs the functions of an oscillator and a modulator, and a receiver and demodulator unit 24, and a power supply source 25 is also provided. The transmitter unit 23 applies a suitable radio frequency (RF) signal to the antenna 21. The radio energy transmitted in this way illuminates the antenna 15 of the sensor unit, which in turn replies with a radio wave at the same frequency which is amplitude-modulated by the circuit 16 as a function of the state of the sensor 12 and as a function of its address. The wave as retransmitted is received by the antenna 21 of the transceiver unit and it produces a signal which is applied to the unit 24 which delivers a binary signal sgn(12) representative of the state of the sensor 12, and thus representative of whether or not the temperature $T_A$ has crossed the threshold $S_A$, with this signal being associated with the address Id(12) of the sensor 12 which corresponds to the above-mentioned N-bit word. This type of circuit is well known and does not need to be described in detail.

The transceiver unit 20 is connected via any appropriate means to a control unit (not shown) conventionally comprising means for storing data, means for processing and displaying data, and where appropriate communications means operating over a link to one or more remote stations.

Figure 2:
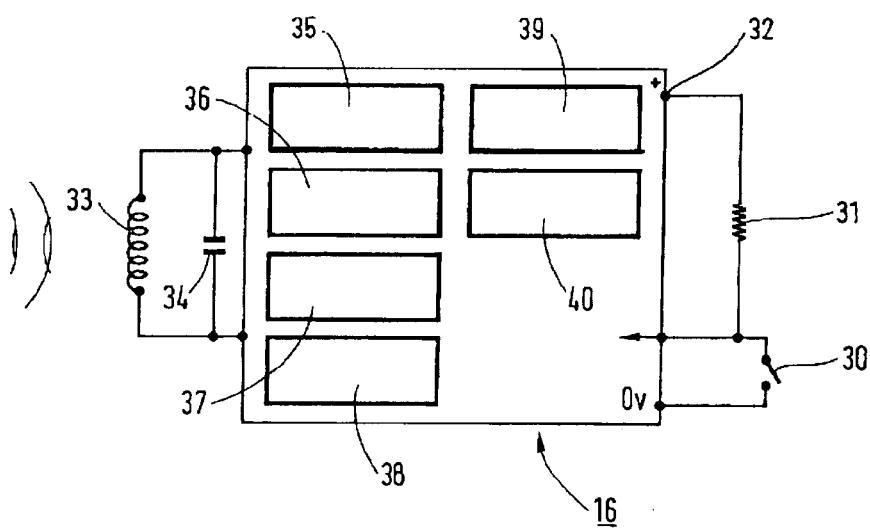
FIG. 2 is an electrical circuit diagram corresponding to the apparatus of FIG. 1.

FIG. 2 is a diagram showing one possible embodiment of the sensor unit 10. The temperature sensor 12 is merely represented by its normally open contact 30. The contact 30 is included in a circuit including a "pull-up" resistor 31 and connected between ground and a positive terminal 32 of the circuit 16. The signal representing the state of the contact 30 as taken from the connection between the contact 30 and the resistor 31 is applied to the circuit 16.

The antenna 15 is represented by an inductor 33 and a capacitor 34 connected in parallel and connected to the circuit 16.

The circuit 16 performs functions that are represented by blocks in FIG. 2, specifically: receiving the antenna signal (block 35); rectifying the antenna signal and generating a DC power supply voltage (block 36) to enable the circuit 16 and the circuit formed by the resistor 31 and the contact 30 to operate; producing the radio signal carrier from the antenna signal and at the same frequency (block 37); modulating the carrier as a function of the address of the sensor 12 (block 38); storing the address of the sensor (block 39); and inverting the modulation as a function of the contact state signal (block 40).

This type of circuit can be implemented without special difficulty using conventional electronic techniques.

The above-described embodiment is characterized by the simplicity with which it can be implemented. Because there is no wire link between the sensor unit and the transceiver unit, and because as mentioned above the sensor unit does not require its own power source, the only operation needed is to fix the sensor unit 10 on the conductive busbar 1 at the point A, and this can be done using adhesive or any other appropriate means.

The two-state sensor used in this embodiment is a very simple, low-cost component. In addition, such sensor has the advantage of yielding a digital signal without the need for a digitization circuit. As explained below, however, the use of other types of sensors can also be contemplated.

Variant embodiments comprising a combination of at least two sensor units together with a single transceiver unit also form part of the present invention. Such variants are not shown since they make use of the same meanings as shown in FIGS. 1 and 2.

A first variant embodiment consists in providing at least two sensor units having respective sensors that are sensitive to temperature at the same point A of the busbar 1, but which change state at different temperature threshold $S_1$ and $S_2$, thereby providing a degree of redundancy and also providing finer analysis of heating. In the example described, the thresholds $S_1$ and $S_2$ can thus be fixed respectively at 80° C. and at 100° C.

Another variant embodiment consists in providing at least two sensor units, in which the sensors are responsive to temperature at different points B and C on the busbar 1 so as to enlarge the area being monitored and so as to provide a degree of redundancy, it being possible in this case for the sensors to have thresholds that are identical or different.

Another variant embodiment makes use of sensors that respond to different physical parameters so as to enable the resulting information to be interpreted in more complete manner.

It can be appropriate to associate a sensor unit having a two-state temperature sensor as described above with a sensor unit having a two-state current sensor, the sensors being arranged to monitor the crossing respectively of a temperature threshold and a current threshold at the same point A. Two-state current sensors that do not require an independent power supply are known. By way of example, a device having an electromagnet can be mentioned. It will be observed under such circumstances, the circuit 16 associated with the current sensor can be substantially identical to the above-described circuit which is associated with a temperature sensor.

Another parameter that can be monitored in combination with temperature is the pressure of gas in the vicinity of a live part.

The combinations described above can themselves be combined without difficulty in order to satisfy specific needs. Thus, a first set of sensor units can be provided that are made up of pairs of sensor units responsive to the crossing of different temperature thresholds at the same point on a conductive busbar with a sensor unit that is responsive to current at the same point, together with second and third sets of sensor units of identical makeup located at different points, and all them associated with a single transceiver unit.

The above-described embodiments make use of a two-state sensor (or several such sensors) responsive to the monitored parameter crossing a given threshold. Alternatively, it is also possible to use a "digital sensor" (or several digital sensors) which provides a digital signal indicative of the value of the parameter to be monitored. Such a digital sensor typically includes an analog sensor and a digitizing circuit connected to the output of the analog sensor for producing a digital signal from the analog signal provided by the analog sensor. The same combinations as descrived hereinabove in the case of two-state sensors may also be contemplated with such digital sensors.

The invention is not limited to the embodiment described. It is equally applicable to monitoring live elements at high or medium voltage other than conductors, for example insulating parts. More generally, it is applicable to continuously monitoring live electrical equipment at high or medium voltage, particularly when the points to be monitored are inaccessible while they are in operation.

What is claimed is:

1. A method of monitoring live electrical equipment at high or medium voltage, the method comprising the following steps:
   emitting a radio wave for illuminating a zone of the equipment in radio energy close to a point where a physical parameter is to be monitored;
   re-emitting the received radio wave with amplitude-modulation responsive to a digital signal related to said physical parameter; and
   receiving the retransmitted radio wave outside the equipment and demodulating it to obtain a signal related to said parameter.

2. A method of monitoring live electrical equipment at high or medium voltage, the method comprising the following steps;
   emitting a radio wave for illuminating a zone of the equipment in radio energy close to a point where physical parameter is to be monitored;
   re-emitting the received radio wave with amplitude-modulation responsive to said physical parameter crossing a threshold at said point; and
   receiving the retransmitted radio wave outside the equipment and demodulating it to obtain a signal indicative of said threshold being crossed.

3. A method according to claim 1, in which said physical parameter is temperature.

4. A method according to claim 2, in which said physical parameter is temperature.

5. An apparatus for monitoring live electrical equipment at high or medium voltage, the apparatus comprising:
   at lease one sensor unit placed on the equipment, comprising a first radio antenna, a sensor for producing a digital signal related to a determined physical parameter at a point to be monitored, and amplitude-modulation means connected to the sensor and to the first antenna, and activated by the energy received by said antenna;
   a transceiver unit placed outside the equipment and having a second radio antenna for emitting a radio wave to illuminate the first antenna, a power supply source, and signal processing means connected to the second antenna; and
   the first antenna retransmitting towards the second antenna the radio wave that has been transmitted thereby, while simultaneously amplitude-modulating it in response to the output signal of the sensor, said signal processing means being arranged to provide a signal related to said parameter.

6. An apparatus for monitoring live electrical equipment at high or medium voltage, the apparatus comprising:
   at least one sensor unit placed on the equipment, comprising a first radio antenna, a two-state sensor responsive to a determined physical parameter at a point to be monitored, the sensor changing state when said parameter crosses a threshold, and amplitude-modulation means connected to the sensor and to the first antenna, and activated by the energy of a radio wave received by said antenna;
   a transceiver unit placed outside the equipment and having a second radio antenna for illuminating the first antenna, a power supply source, and signal processing means connected to the second antenna; and
   the first antenna retransmitting towards the second antenna the radio wave that has been transmitted thereby, while simultaneously amplitude-modulating it in response to the state of the sensor, said signal processing means being arranged to provide a signal sign (12) indicative of the state of the sensor.

7. An apparatus according to claim 6, in which at least two sensor units are provided on the equipment, each sensor unit being arranged to receive the wave transmitted by the second antenna and to retransmit an amplitude-modulated wave to the second antenna, the modulation being a function of the state of the sensor and of identity information, the processing means of the transceiver unit being arranged to deliver said signals with information identifying the respective sensor units.

8. An apparatus according to claim 7, in which said parameter is temperature.

9. An apparatus according to claim 8, in which at least one sensor unit is provided in which the sensor is responsive to a second physical parameter crossing a threshold at the same point on the equipment.

10. An apparatus according to claim 7, in which the second physical parameter is current.

11. An apparatus for monitoring high or medium voltage electrical equipment, the apparatus comprising:
    at least one sensor unit per phase, the unit being placed on a live element of the equipment and comprising a first radio antenna, a two-state sensor responsive to temperature at a point of said live element, the sensor changing state when the temperature crosses a threshold, and amplitude-modulation means connected to the sensor and to the first antenna, and activated by the energy of a radio wave received by said first antenna;
    a transceiver unit placed outside the equipment and having a second radio antenna for illuminating the first antenna, a power supply source, and signal processing means connected to the second antenna; and
    the first antenna retransmitting to the second antenna the radio wave transmitted by the second antenna together with amplitude-modulation in response to the state of the sensor and to information identifying the sensor, said signal processing means being arranged to supply, for each sensor unit, a signal sgn(12) indicative of the state of the sensor together with associated identity information Id(12).

12. An apparatus according to claim 11, in which at least two sensor units are provided having respective sensors responsive to temperature at the same point, said sensors changing state on crossing different thresholds.

13. Apparatus according to claim 11, in which a plurality of sensor units are provided in which the respective sensors are responsive to temperature at different points.

14. An apparatus according to claim 11, which at least one sensor unit is provided in which the sensor is responsive to a second physical parameter other than temperature.

15. An apparatus according to claim 14, in which said second physical parameter is the current in said live element.

16. An apparatus according to claim 14, in which the sensors are responsive respectively to the value of the temperature and to the value of said second parameter at the same point.

17. An apparatus according to claim 11, in which the temperature sensor comprises a temperature switch mounted on said live element, and a circuit connected to the first antenna and including a contact which changes state when the temperature crosses said threshold.

* * * * *